United States Patent [19]
Casey

[11] 3,987,953
[45] Oct. 26, 1976

[54] WELDMENT FOR BULLDOZER BLADES AND METHOD AND APPARATUS THEREFOR

[75] Inventor: Thomas P. Casey, Burlington, Iowa

[73] Assignee: Caterpillar Tractor Co., Peoria, Ill.

[22] Filed: Feb. 28, 1975

[21] Appl. No.: 554,246

Related U.S. Application Data

[62] Division of Ser. No. 469,337, May 13, 1974, Pat. No. 3,921,728.

[52] U.S. Cl. ............................................. 228/166
[51] Int. Cl.² ......................................... B23K 31/02
[58] Field of Search ........... 228/165, 166, 167, 169, 228/185

[56] References Cited
UNITED STATES PATENTS

| | | | |
|---|---|---|---|
| 2,867,036 | 1/1959 | Hovelmann | 228/165 |
| 2,988,811 | 6/1961 | Huet | 29/157.4 |
| 3,458,224 | 7/1969 | Freese | 228/165 X |

Primary Examiner—Al Lawrence Smith
Assistant Examiner—Margaret Joyce
Attorney, Agent, or Firm—Phillips, Moore, Weissenberger, Lempio & Strabala

[57] ABSTRACT

A bulldozer blade comprises a push plate having a cutting edge mounted on a lower end thereof and a plurality of structural members secured on the back of the push plate and welded together to increase the structural integrity thereof. Each adjacent pair of such members are joined together at a weldment comprising a groove and contiguous dam formed on a surface of one member to have a corner of the other member disposed adjacent thereto and common weld means at least substantially filling the groove and securing the members together. The groove and dam are preformed on an arcuate portion of the first member during a cold forming operation.

2 Claims, 4 Drawing Figures

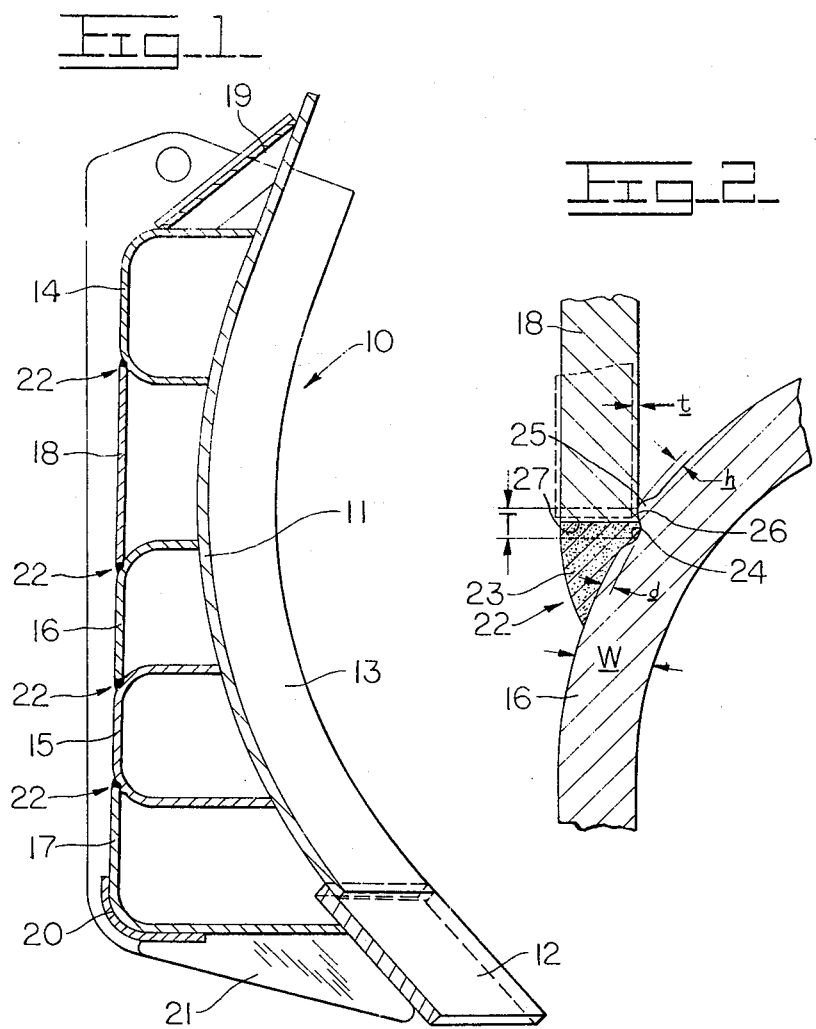

WELDMENT FOR BULLDOZER BLADES AND METHOD AND APPARATUS THEREFOR

This is a division of Ser. No. 469,337, filed May 13, 1974, now U.S. Pat. No. 3,921,728.

BACKGROUND OF THE INVENTION

Conventional bulldozer blades normally comprise a plurality of overlapped structural members welded onto the back of the push plate thereof to form a strong cellular construction. It has proven difficult to form the backside of such integrated members substantially flat to reduce stress concentrations thereat and to also provide a mounting surface for brackets and the like. The structural members are normally overlapped to back-up the welds which secure the members together. Such a construction oftentimes results in weld "blow-through," primarily due to manufacturing irregularities in the abutting edges of the secured members, which creates a crack thereat to induce premature failure of the integrated structure.

SUMMARY OF THIS INVENTION

An object of this invention is to overcome the above, briefly described problem by providing a structurally sound and economical weldment, particularly adapted for use in work implements such as bulldozer blades, and a method and apparatus for making the same. The weldment comprises a first member having a groove and contiguous dam formed on a surface thereof, a second member having a corner thereof disposed closely adjacent to the groove and dam and common weld means at least substantially filling the groove and securing the members together. The groove and dam are preformed on the first member by a forming roll of an apparatus which further comprises a plurality of support rollers mounted on either side of the member.

BRIEF DESCRIPTION OF THE DRAWINGS

Other objects of this invention will become apparent from the following description and accompanying drawings wherein:

FIG. 1 is a cross sectional view, in elevation, of a bulldozer blade having four weldments of this invention structurally integrated therein;

FIG. 2 is an enlarged fragmentary view of one of the weldments;

DETAILED DESCRIPTION

Figure 3:
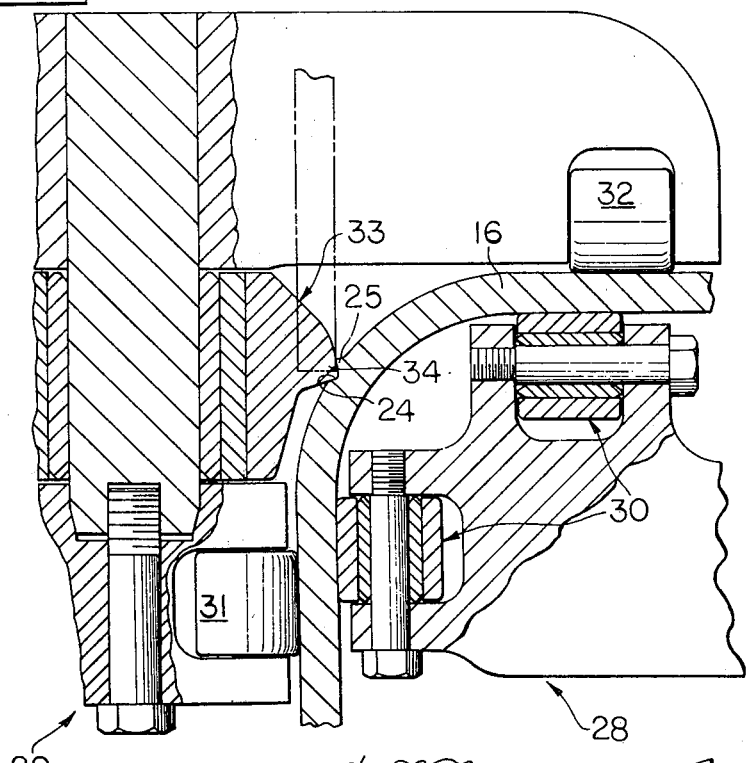
FIG. 3 is a sectional view of an apparatus used to preform a groove and contiguous dam in a structural member employed in such weldment.

FIG. 1 discloses a bulldozer blade 10 comprising a push plate 11 having an elongated cutting edge 12 mounted on a lower end thereof and a pair of mold board plates 13 (one shown) secured on opposite, lateral ends thereof. The push plate is structurally reinforced by securing a plurality of metallic members on a back side thereof, including a pair of channel members 14 and 15, a pair of arcuate plate members 16 and 17 and a flat plate member 18. The blade may be further reinforced by plate members 19 and 20 and a plurality of gusset members 21 (one shown).

Members 14–18 are secured together by four substantially identical weldments 22 to facilitate the disposition of the flat back sides of the members substantially coplanar, as shown in FIG. 1. Referring to FIG. 2, each weldment comprises a common weld means 23 securing each pair of adjacent first and second members, such as members 16 and 18, together. First member 16 has a groove 24 of predetermined depth $d$ formed on a surface thereof to terminate at one side thereof at a contiguous, raised dam 25 of predetermined height $h$, above such surface.

Second member 18 has a corner 26 thereof preferably disposed within the groove and closely adjacent to the dam. The dam will function to "back-up" the hot weld metal to prevent blow through thereof during an arc welding operation. Weld 23 at least substantially fills groove 24 and secures corner 26 and a contiguous bottom flat surface 27 of member 18 to the outer surface of member 16.

In the preferred embodiment of this invention, dimensions $d$ and $h$ are at least approximately equal. In addition, dimension $d$ is preferably selected from the range of from 0.1W to 0.25W, with W constituting the wall thickness of member 16. As further shown in FIG. 2, member 18 can be positioned within manufacturing tolerance ranges $t$ and $T$ without affecting the integrity of weld 23.

FIG. 3 illustrates an apparatus and method for preforming groove 24 and dam 25 on the outer arcuate surface of member 16, for example. Such apparatus comprises first and second support and guide assemblies 28 and 29, respectively disposed on either side of member 16. First assembly 28 comprises a pair of first and second support rollers 30, disposed for rotation on axes perpendicular to each other.

Second assembly 29 comprises a like pair of third and fourth guide rollers 31 and 32 disposed for rotation on axes perpendicular to each other. Each of the latter rollers at least partially overlies a respective roller 30. Assembly 29 further comprises a rotary forming roll or die 33, rotatably mounted thereon about an axis parallel to the rotational axis of roller 31.

Rotary forming roll 33 is preferably driven by motor means, not shown, and has an annular cutting edge 34 formed on the periphery thereof. During the preforming operation, cutting edge 34 forms elongated groove 24 and displaces material therefrom upwardly to form dam 25. It should be understood that different sized rollers could be substituted in lieu of roller 33 to vary the size and shape of groove 24 and dam 25.

Figure 4:
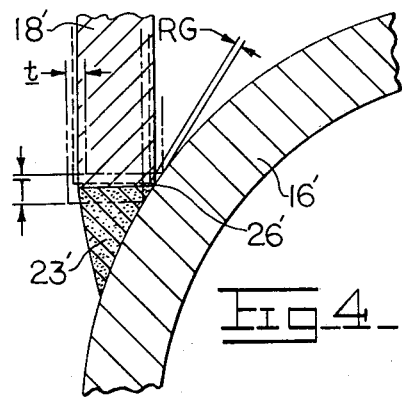
FIG. 4 is a cross sectional view similar to FIG. 2, illustrating a prior art weldment.

FIG. 4 illustrates a prior art weldment comprising a first member 16' secured to a second member 18' by an elongated weld 23'. As shown, member 18' has been positioned on the outer arcuate surface of member 16' so that at least a portion of its corner 26' is disposed in line contact therewith. Such disposition represents an ideal disposition for manufacturing purposes wherein a zero root gap RG is provided.

However, even such an ideal match-up would require unduly close manufacturing control during the arc welding operation to prevent blow through at gap RG. Furthermore, in actual practice the dimensions of prefabricated members 16' and 18' will normally vary to in turn vary the match-up therebetween within the illustrated manufacturing tolerances $t$ and $T$. Thus, a pronounced root gap RG will exist at various locations between edge 26' and member 16' to permit blow through of the weld. Such blow through will normally occur even though root gap RG merely constitutes one-sixty-fourth of an inch, for example.

Unless such root gaps are filled or additional structural members are secured between members 16' and 18', prior to placement of the bulldozer blade in the field, structural failures will occur. Field repair of the bulldozer blade, such as by welding a strap or plate across the cracked area, is time consuming and expensive and does not always result in a structurally sound blade construction.

I claim:

1. A method for making a weldment in bulldozer blades and the like providing for the prevention of blow-through of hot weld metal through the weld-joint during welding wherein an arcuate metallic first member is secured to a metallic second member having a planar end section by a weld consisting of the steps of simultaneously forming an elongated groove of predetermined depth below the surface of said first member, and forming an elongated dam of predetermined height above said surface in contiguous relationship with respect to said groove, disposing a corner of the planar end of said second member within said groove and at least closely adjacent to said dam, and welding the corner of said second member to said first member at said groove.

2. The method of claim 1 wherein the step of forming said groove and said dam provide that the corner of said second member abuts said groove collinearly along an entire length of a weld formed by said welding step.

* * * * *